UNITED STATES PATENT OFFICE.

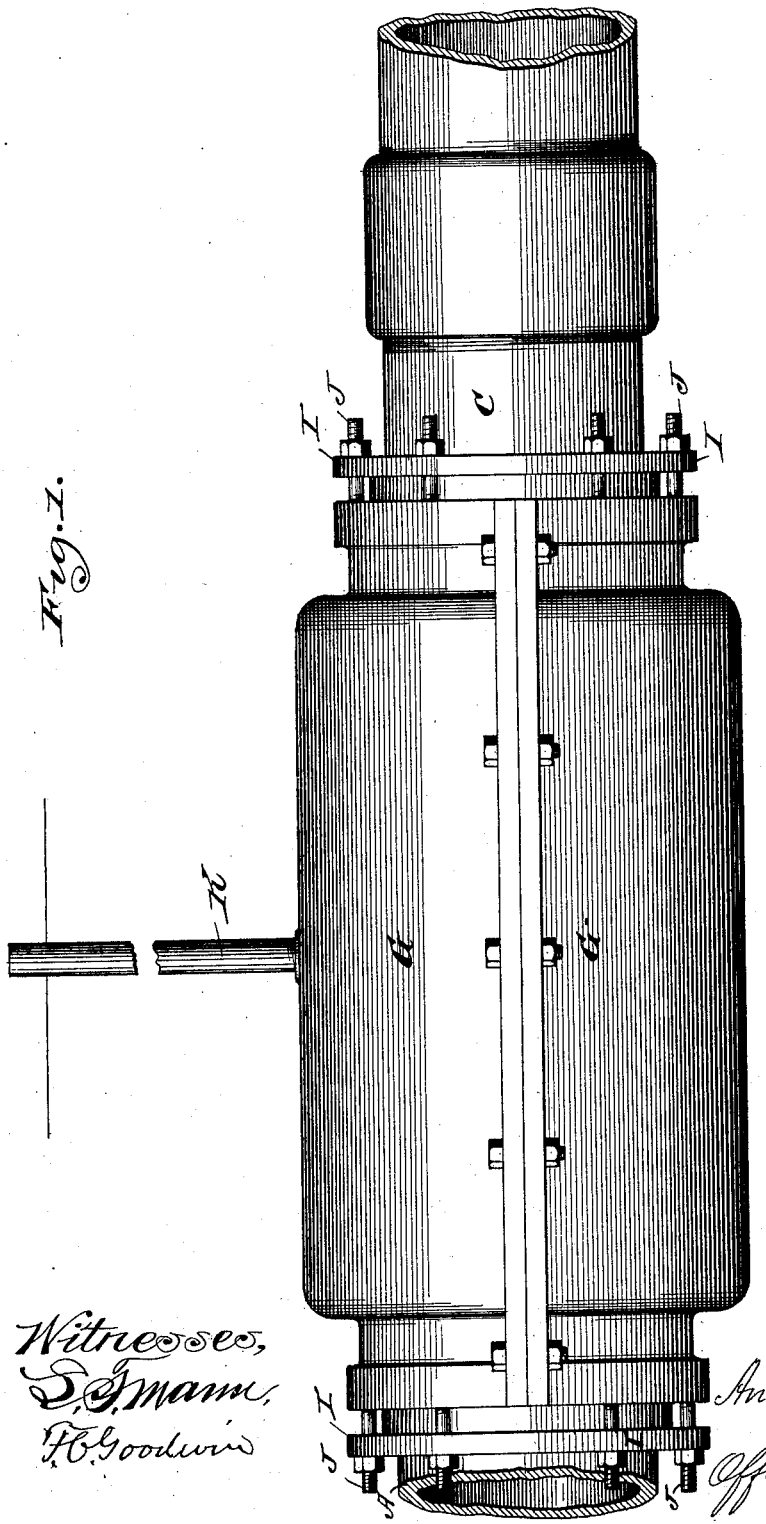

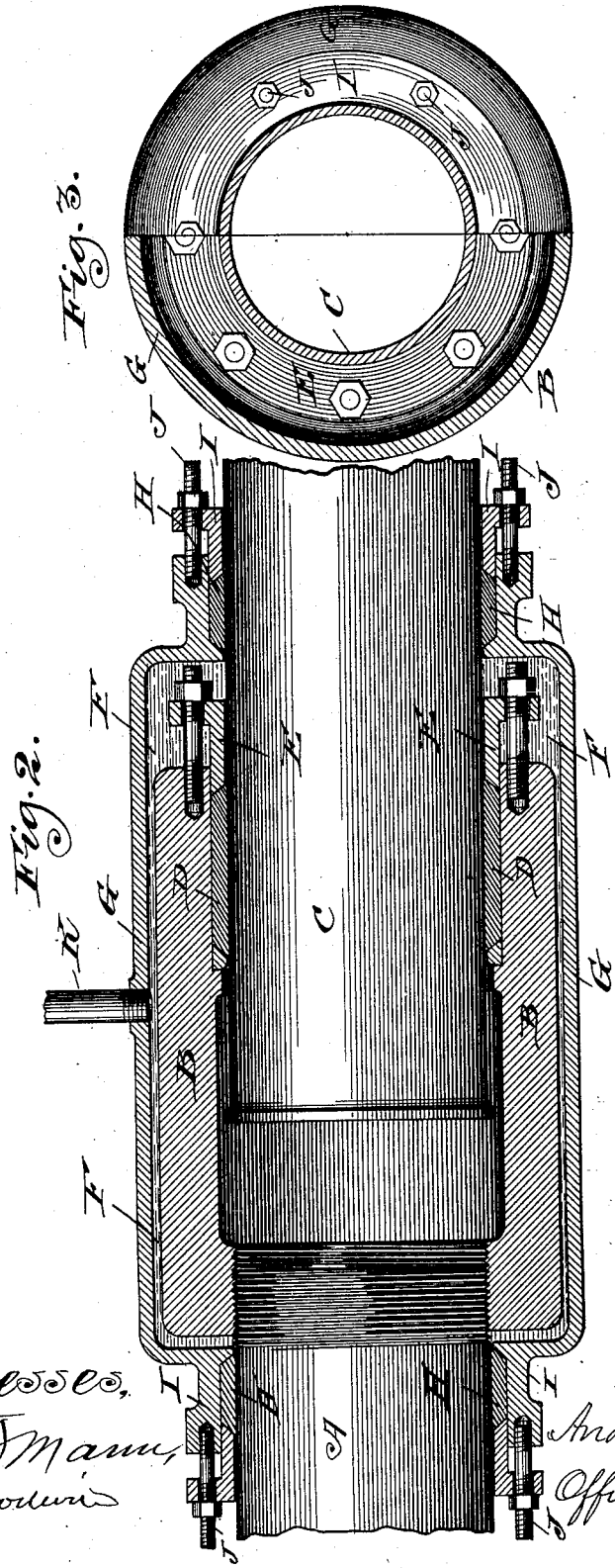

ANDREW J. AVERY, OF DUNKIRK, NEW YORK.

PIPE-COUPLING.

SPECIFICATION forming part of Letters Patent No. 603,720, dated May 10, 1898.

Application filed August 17, 1891. Serial No. 402,870. (No model.)

*To all whom it may concern:*

Be it known that I, ANDREW J. AVERY, a citizen of the United States, residing at Dunkirk, in the county of Chautauqua and State of New York, have invented certain new and useful Improvements in Pipe-Couplings, of which the following is a specification.

My invention relates to certain improvements in the couplings for pipes of pipe-lines for conveying gas, oil, and other liquids or fluids; and the invention is particularly intended to provide a coupling which shall withstand the expansion and contraction of the metal of the pipes without any loosening of the joint, whereby the liquid or fluid is permitted to escape. The loss, owing to defective joints, is considerable in the operation of all pipe-lines and particularly in the piping of natural gas. One of the principal causes of loss is the opening up of the joints, caused by the expansion and contraction of the pipes and couplings. To obviate this, I provide a slip-joint which will not expand at all or not to as great an extent as the pipes under the pressure of the gas or other fluid, and which can be used at such intervals as will compensate for the expansion and contraction of the pipe, and which may be employed at each joint throughout the line.

Around the coupling is preferably placed a jacket of such size as to entirely inclose the coupling and forming a chamber adapted to be filled with a fluid, such as oil or other lubricant. The jacket is provided with packing-rings to prevent escape of the fluid. This chamber may have a communication through a suitable tube with the external atmosphere where used as an underground pipe-line, and the oil within the chamber and pipe forms a seal against the escape of the liquid or fluid passing through the pipe-line.

In the accompanying drawings, Figure 1 is a perspective view of the ends of adjoining pipes at the coupling and showing the filling-tube communicating with the lubricant-chamber. Fig. 2 is a longitudinal sectional view, the line-pipes being shown in elevation. Fig. 3 is an end elevation, half-sectional, through the jacket, the line-pipe also showing in section.

In the drawings, A represents a line-pipe having its end exteriorly threaded to engage the threads of a coupling B. This coupling is made very much heavier than the pipes, so as to resist expansion or expand to a less extent than the pipes, whereby a tight joint is always maintained.

C represents a pipe, the end of which is loosely fitted within the coupling, so that it is capable of a sliding movement therein, and D represents the packing, which is confined by the adjustable packing-ring E. Coupling B is provided with a rib B', against which the packing D is forced by ring E. A washer $B^2$ may be employed between rib B' and packing D, if desired. A jacket F surrounds the ends of pipes A and C and incloses also the coupling B and its packing-ring D. This jacket is of sufficient diameter to provide a chamber G, which is filled with a lubricant, preferably a heavy oil, the escape of which is prevented by the packing-rings H, confined by the movable packing-clamps I, having the adjusting-screws J. The jacket is perforated, so that after the parts are drawn tightly together and the coupling effected the chamber may be filled with a lubricant, and by preference this aperture will be provided with a pipe or tube, as K, rising to the surface of the ground, so that the chamber may be filled conveniently.

Both line-pipes may be telescopically connected with the sleeve; but I prefer the construction shown.

I claim—

A pipe-coupling having in combination a sleeve screw-threaded at one end to receive a screw-threaded pipe and adapted to have a pipe telescoped into the other end, a collar or ring entering this end, screws for forcing said collar or ring into said sleeve, a rib on the inside of said sleeve, a packing-ring between said rib and collar, a jacket for said coupling forming a chamber adapted to be filled with a fluid and packing-rings and collars for said jacket to prevent the escape of said fluid, substantially as set forth.

ANDREW J. AVERY.

Witnesses:
WALTER C. SMITH,
WALTER D. HOLT.